United States Patent
Biehl et al.

(10) Patent No.: US 8,965,977 B2
(45) Date of Patent: Feb. 24, 2015

(54) SYSTEM AND METHOD FOR DETERMINING A PRESENCE STATE OF A PERSON

(71) Applicant: Fuji Xerox Co., Ltd., Tokyo (JP)

(72) Inventors: Jacob Biehl, San Jose, CA (US); Althea Turner, Menlo Park, CA (US); Pernilla Quarfordt, Los Altos, CA (US); Anthony Dunnigan, Palo Alto, CA (US); William van Melle, Los Altos, CA (US); Gene Golovchinsky deceased (73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/079,509

(22) Filed: Nov. 13, 2013

(65) Prior Publication Data

US 2014/0067960 A1  Mar. 6, 2014

Related U.S. Application Data

(63) Continuation of application No. 12/687,638, filed on Jan. 14, 2010.

(51) Int. Cl.
*G06F 15/16* (2006.01)
*H04L 29/08* (2006.01)
*G06Q 10/06* (2012.01)

(52) U.S. Cl.
CPC .............. *H04L 67/22* (2013.01); *G06Q 10/06* (2013.01); *H04L 67/24* (2013.01); *H04L 67/28* (2013.01)
USPC ........... 709/204; 709/206; 709/224; 709/228; 370/395.2; 714/47.3; 715/720

(58) Field of Classification Search
CPC ......... H04L 67/22; H04L 67/24; G06Q 10/06
USPC ............... 709/204, 206, 224, 228; 370/395.2; 714/47.3; 715/720
See application file for complete search history.

(56) References Cited

U.S. PATENT DOCUMENTS

| 7,730,134 B2 | 6/2010 | Blagsvedt et al. |
| 7,801,954 B2 * | 9/2010 | Cadiz et al. ............. 709/204 |

(Continued)

FOREIGN PATENT DOCUMENTS

| JP | 10-228502 | 8/1998 |
| JP | 2005-071146 A | 3/2005 |
| JP | 2006-099462 A | 4/2006 |

OTHER PUBLICATIONS

Begole, Work Rhythms: Analyzing Visualizations of Awareness Histories of Distributed Groups, In CSCW, Sun Microsystems Laboratories, Nov. 2002, pp. 334-343.

(Continued)

*Primary Examiner* — Michael C Lai (74) *Attorney, Agent, or Firm* — Morgan, Lewis & Bockius LLP (57) ABSTRACT

A computer system is coupled to a plurality of subscribers via a network. The computer system obtains first presence information that corresponds to a first calendar of a user and obtains second presence information that corresponds to a second calendar of the user that is different from the first calendar. The computer system determines one or more presence states of the user including determining, based on presence information for the user that includes the first presence information and the second presence information, a first presence state of the user. The computer system provides the respective presence state of the user, selected from the one or more presence states of the user, to the subscribers via the network.

17 Claims, 10 Drawing Sheets

(56) References Cited

U.S. PATENT DOCUMENTS

| | | | |
|---|---|---|---|
| 7,822,821 | B2 | 10/2010 | Foote |
| 7,941,762 | B1 | 5/2011 | Tovino et al. |
| 8,078,578 | B2 | 12/2011 | Roberts et al. |
| 2004/0003042 | A1 | 1/2004 | Horvitz et al. |
| 2004/0064567 | A1 | 4/2004 | Doss et al. |
| 2005/0050206 | A1 | 3/2005 | Ueda et al. |
| 2006/0067250 | A1 | 3/2006 | Boyer et al. |
| 2006/0075091 | A1 | 4/2006 | Beyda et al. |
| 2006/0140189 | A1 | 6/2006 | Wu et al. |
| 2007/0135119 | A1 | 6/2007 | Hashimoto et al. |
| 2009/0005082 | A1* | 1/2009 | Forstall et al. ............ 455/456.5 |
| 2009/0288011 | A1 | 11/2009 | Piran et al. |
| 2011/0029824 | A1 | 2/2011 | Scholer et al. |
| 2011/0173260 | A1 | 7/2011 | Biehl et al. |
| 2011/0306298 | A1 | 12/2011 | Lyman |

OTHER PUBLICATIONS

Brown, Guided, Cooperative Learning and Individual Knowledge Acquisition, in Knowing, Learning, and Instructions, Lawrence Erlbaum, NJ, 1989, pp. 393, 451.

Cadiz, Designing and Deploying and Information Awarenes Interface, CSCW, 2002, pp. 314-323.

Diehl, Productivity Loss in Brainstorming Groups: Toward the Solution of a Riddle, J. Personality and Social Psychology, 1987, vol. 53, No. 3, pp. 497-509.

Dimicco, Motivations for Social Networking at Work, IBM Research, CSCW, Nov. 2008, pp. 711-720.

Dourish, Portholes: Supporting Awareness in a Distributed Work Group, Conf. on Human Factors in Computing Systems, ACM, CHI '92, May 3-7, 1992, pp. 541-547.

Fogarty, Toolkit Support for Developing and Deploying Sensor-Based Statistical Models of Human Situations, Conf. on Human Factors in Computing Systems, ACM, CHI 2007, Apr. 28-May 3, 2007, pp. 135-144.

Fogarty, Examining Task Engagement in Sensor-Based Statistical Models of Human Interruptibility, Conf. on Human Factors in Computing Systems, CHI 2005, Apr. 2-7, 2005, pp. 331-340.

Gabarro, The Development of Working Relationships, Handbook of Organizational Behavior, Prentice Hall, 1987, Ch. 12, pp. 172-189.

Gutwin, A Descriptive Framework of Workspace Awareness for Real-Time Groupware, Kluwer Academic Publishers, 2001, pp. 411 and 446.

Hong, An Architecture for Privacy-Sensitive Ubiquitous Computing, MobiSys '04, 2004, 12 pgs.

Horvitz, Learning and Reasoning about Interruption, Conf. on Multimodal Interfaces, ICMI 03, Nov. 5-7, 2003, pp. 20-27.

Krauss, Mutual Knowledge and Communicative Effectiveness, Intellectual Teamwork: Social and Technological Foundations of Cooperative Work, Lawrence Erlbaum Assoc. Inc., 1990, pp. 111-145.

Paulus, Idea Generation in Groups: A Basis for Creativity in Organizations, Organizational Behavior and Human Decision Processes, vol. 82, No. 1, May 2000, pp. 76-87.

Salber, The Context Toolkit: Aiding the Development of Context-Enabled Applications, CHI '99, May 15-20, 1999, 8 pgs.

Tsai, Social Capital and Value Creation: The Role of Intrafirm Networks, J. The Academy of Management, vol. 41, No. 4, Aug. 1998, pp. 464-476.

Twitter, Share and Discover What's Happening Right Now Anywhere in the World, twitter.com, Jan. 21, 2010, 3 pgs.

Wikipedia, JammerDirect, jammerdirect.com, Jan. 21, 2010, 3 pgs.

Fuji Xerox Co., Office Action, JP 2010-184824, Apr. 7, 2014, 6 pgs.

Nakajima, Jun, Office Action, App No. JP2010-184824, Apr. 7, 2014, 6 pgs.

* cited by examiner

SYSTEM AND METHOD FOR DETERMINING A PRESENCE STATE OF A PERSON

RELATED APPLICATIONS

This application is a continuation of U.S. patent application Ser. No. 12/687,638, filed Jan. 14, 2010, entitled "System and Method for Determining a Presence State of a Person," which application is incorporated by reference in its entirety.

TECHNICAL FIELD

The disclosed embodiments relate generally to determining a presence state of a person.

BACKGROUND

Effective communication is essential to enabling successful collaboration. It enables collaborators to build common ground, to foster ideas, to develop the complex interpersonal relationships that facilitate effective interactions, and more. In the modern workplace, successful collaboration translates into improved productivity, creativity, and the overall well-being of workers. An important aspect of effective communication is having ongoing group awareness, which includes knowledge of current projects, the current status of co-workers, and how actions of group members may affect other group members.

Fostering group awareness has become an increasingly difficult challenge in today's modern workplaces. Workers may have flexible schedules (e.g., working outside the typical 9-6 workday, working in different time zones, etc.) or may work from remote locations (e.g., such as distributed work locations, client sites, at home, public places, etc.). Furthermore, workers use increasingly using specialized collaboration tools (e.g., video chat, virtual world, social networks, etc.) to communicate with peers. Accordingly, determining group awareness of co-workers is difficult, time consuming, and error prone. Thus, it is highly desirable to provide a system and method for determining a presence state of a person without the aforementioned problems.

SUMMARY

To address the aforementioned deficiencies, some embodiments provide a system, a computer readable storage medium including instructions, and a method for determining a presence state of a person. In these embodiments, data and/or sensor aggregators produce one or more data feeds including data on presence states of persons based on data received from sensors (e.g., physical sensors) and/or data sources (e.g., calendars, etc.). The presence states of a person are then determined from one or more data feeds received from data and/or sensor aggregators. Each of the data feeds may indicate a respective presence state of a respective person. For example, a camera in an office of the person may indicate whether the person is in the person's office or not. Similarly, a wireless beacon may indicate whether a wireless device of the person is within range of the wireless beacon. A single presence state (e.g., the presence state with the highest level of specificity) may be reported to subscribers. Alternatively, a composite presence state generated by the combination of two or more presence states may be reported to subscribers. Furthermore, a person (or an administrator) may opt into allowing the sensors and/or the data sources to monitor the presence states of the person.

Some embodiments provide a client application that allows a person to subscribe to and to view the presence state of other persons in an organization. In these embodiments, the user interface of the client application displays tiles for persons in the organization that indicate the presence states of the persons. Clicking on (or hovering over) a respective tile for a respective person causes the client application to display additional information about the respective person. For example, the additional information may include contact information, a current presence state, a user-supplied status message, and the like. The client application also includes a user interface for allowing a person to opt into allowing data feeds to monitor the presence states of the person. In doing so, the person may control what types of data are collected by the sensor aggregators and/or the data source aggregators.

BRIEF DESCRIPTION OF THE DRAWINGS

Like reference numerals refer to corresponding parts throughout the drawings.

DESCRIPTION OF EMBODIMENTS

Some embodiments provide group awareness information to subscribers by processing one or more data feeds that monitor the presence states of users and publishing respective presence states of the users to a group of subscribers. In some embodiments, the subscribers are notified as to a person's current location, availability, current task, and/or preferred communication channels.

Figure 1:
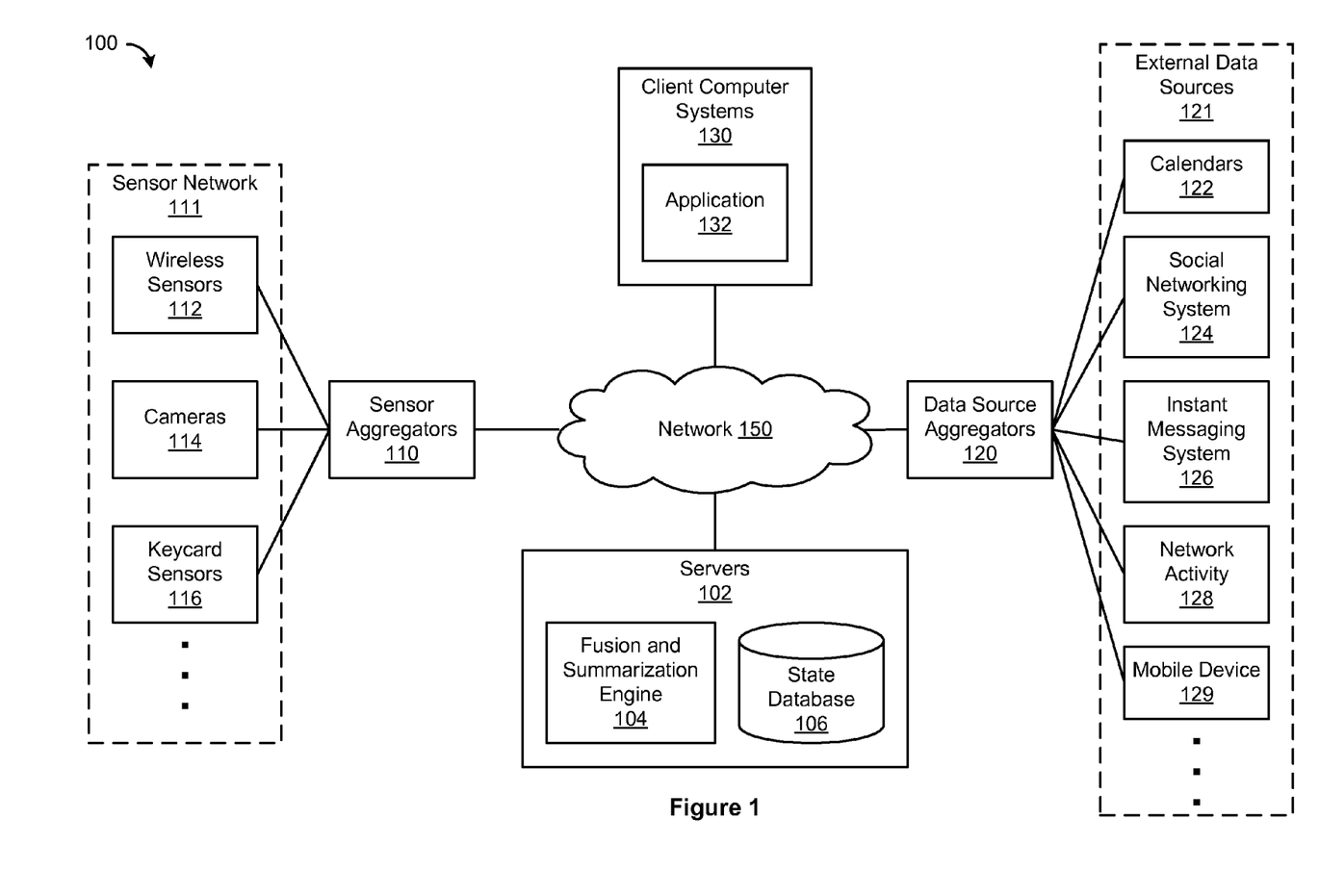
FIG. 1 is a block diagram illustrating a system for determining a presence state of a person, according to some embodiments.

FIG. 1 is a block diagram illustrating a system 100 for determining a physical presence state of a person, according to some embodiments. The system 100 includes servers 102, sensor aggregators 110, data source aggregators 120, and client computer systems 130. The servers 102, the sensor aggregators 110, the data source aggregators 120, and the client computer systems 130 are coupled to each other via network 150. Network 150 can generally include any type of wired or wireless communication channel capable of coupling together computing nodes. This includes, but is not limited to, a local area network, a wide area network, or a combination of networks. In some embodiments, network 150 includes the Internet.

In some embodiments, the sensor aggregators 110 aggregate sensor data received from a sensor network 111. Each sensor in the sensor network 111 provides a data feed to the sensor aggregators 110. The sensor aggregators 110 aggregate the data included in the data feeds received from the sensors in the sensor network 111 and provides one or more aggregated data feeds to the servers 102. In some embodiments, the sensor network 111 includes one or more of wireless sensors 112, cameras 114, and keycard sensors 116.

In some embodiments, the wireless sensors 112 are placed at predetermined locations (e.g., within a building, outside of the building, within range of a particular wireless sensor, etc.). In these embodiments, each of the wireless sensors 112 provides a data feed (e.g., also referred to as a "wireless data feed") including data about wireless devices registered to persons that are within range of the wireless sensors 112. In some embodiments, the wireless sensors 112 include a Bluetooth sensor, a Wi-Fi sensor, a cellular sensor, an RFID sensor, a radio frequency sensor, and an ultrasonic sensor. Note that other wireless sensors may be used.

Figure 8:
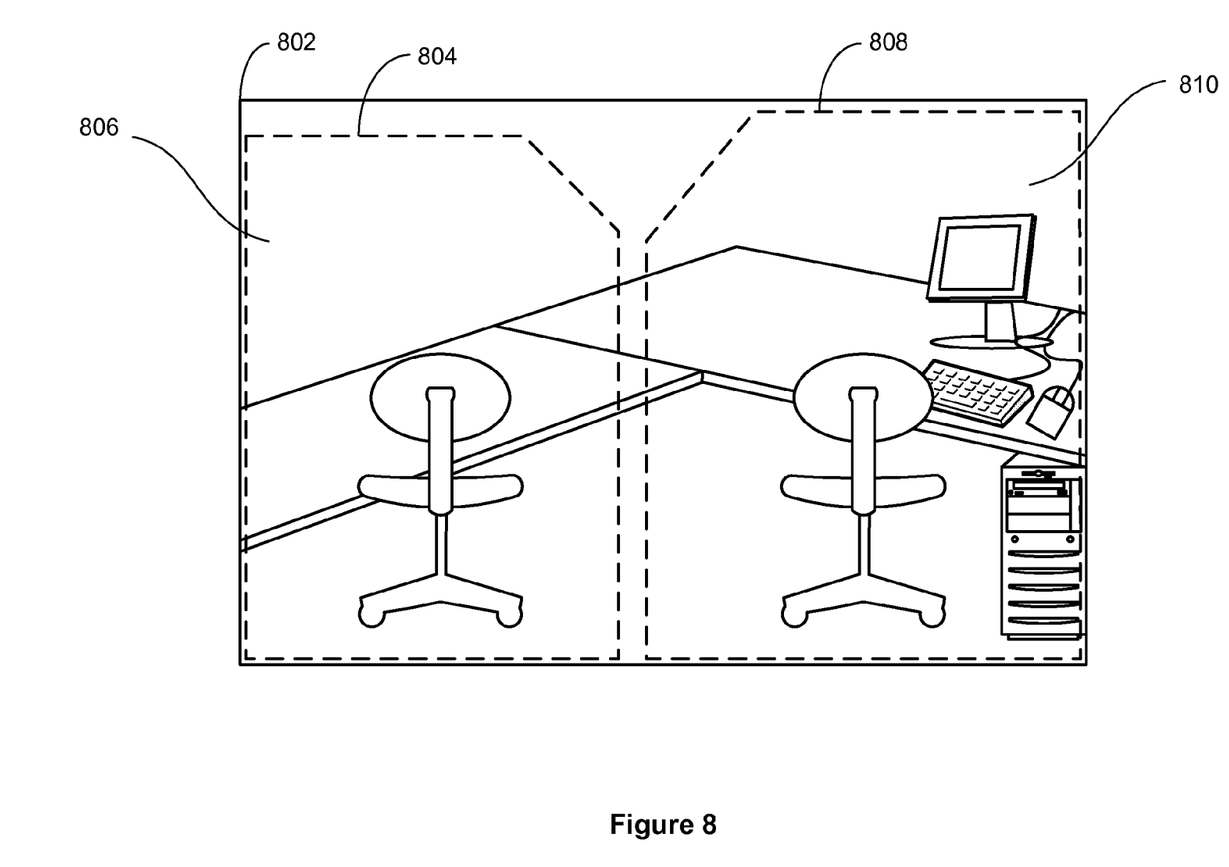
FIG. 8 illustrates a frame of a camera data feed showing an exemplary workspace of a person, according to some embodiments.

In some embodiments, the cameras 114 are located within offices of persons. In these embodiments, a respective camera provides a video data feed of at least a workspace of a respective person that is analyzed to determine whether the respective person and/or a visitor is in the office of the respective person. In some embodiments, the person defines an area of the workspace typically occupied by the person when the person is in the office. In some embodiments, the person defines an area of the workspace typically occupied by a visitor when a visitor is in the office. For example, FIG. 8 illustrates a frame 802 of a camera data feed showing an exemplary workspace of a person, according to some embodiments. As illustrated in FIG. 8, the person drew a bounding box 804 for a zone 806 of the workspace of the person that is typically occupied by a visitor when a visitor is in the office. The person also drew a bounding box 808 for a zone 810 of the workspace of the person that is typically occupied by the person when the person is in the office. Note that some persons may share offices or may work in cubicles. In these cases, a single camera may provide a video data feed that includes workspaces of more than one person. Accordingly, each person defines the person's respective workspace and respective visitor spaces.

In some embodiments, the keycard sensors 116 are placed at predetermined locations (e.g., at predetermined doors inside and outside of a building, etc.). In these embodiments, each of the keycard sensors 116 provides a keycard data feed including data about times at which a keycard registered to a person was used at a keycard sensor 116.

Note that other sensors may be used. For example, a microphone in an office may be used to detect office activity based on sound patterns. Similarly, a light sensor may be used to detect overall ambient light to determine if the office is occupied. Furthermore, multiple sensors may be used in combination to determine how many people are in a given location (e.g., a camera data feed and a microphone data feed may be used to determine number of people present in the physical environment).

In some embodiments, a separate sensor aggregator aggregates data from each type of sensor (e.g., the wireless sensors 112, the cameras 114, the keycard sensors 116, etc.).

In some embodiments, the data source aggregators 120 aggregate data received from external data sources 121. Each data source in the external data sources 121 provides a data feed to the data source aggregators 120. The data source aggregators 120 aggregate the data included in the data feeds received from the data sources in the external data sources 121 and provide one or more aggregated data feeds to the servers 102. In some embodiments, the external data sources 121 include calendars 122, social networking systems 124, instant messaging systems 126, network activity data source 128, and mobile device data sources 129.

In some embodiments, the calendars 122 are calendars for persons. In these embodiments, each of the calendars 122 provides a calendar data feed including locations and times of appointments of a respective person. Note that the respective person may have more than one calendar and all or a subset of these calendars may be used. In some embodiments, the calendar is selected from the group consisting of: a personal calendar, a group calendar, an event calendar, and a business calendar.

The social networking systems 124 and the instant messaging systems 126 typically allow persons to provide user-updated statuses. Thus, in some embodiments, the social networking systems 124 and/or the instant messaging systems 126 provide user-updated status data feeds including the current statuses of persons posted on the social networking systems 124 and/or the instant messaging systems 126.

In some embodiments, the network activity data source 128 monitors network activity of network devices that are registered to persons. In some embodiments, the network data feed monitors data in a network selected from the group consisting of: an office computer network, office phone network, a public computer network, and a home computer network. A location of a network device may be determined by analyzing a network address (e.g., an Internet Protocol address) to determine a location associated with the address. For example, an Internet Protocol (IP) address may be analyzed to determine a geographic location associated with the IP address. In some embodiments, the network devices are located at predetermined locations (e.g., within a building, at particular buildings, etc.). For example, the network activity data source 128 may indicate that a person's office computer is offline, the person's office computer is online and on the corporate LAN, the person's office computer is online and on the corporate VPN, the person's office computer is being used or not used, and the person's office phone is being used or not used. In these embodiments, a device identifier and/or a network address of the network device (e.g., a MAC address or an IP address) are analyzed to determine a location of the network device in the building. For example, the network address is used to perform a lookup in a database including information about registered network devices at predetermined locations.

Many mobile devices have positioning systems (e.g., a global satellite positioning system such as GPS and cellular tower-based positioning system) coupled to a communication system (e.g., Wi-Fi, Bluetooth, and cellular). Accordingly, these mobile devices may determine their respective positions and transmit data regarding their positions to the servers 102. Thus, in some embodiments, the mobile device data source 129 provides mobile device data feeds that report locations determined by mobile devices of persons.

Note that other external data sources may be used. For example, RSS feeds of announcements related to a specific person may be used to determine a presence state of persons. Similarly, a combination of external data sources may be used to determine the presence state of persons (e.g., linking RSS feeds of meeting minutes at a particular location and time with user location/event data provided by external calendars).

In some embodiments, a separate data source aggregator aggregates data from each type of data source (e.g., the calendars 122, the social networking systems 124, the instant messaging systems 126, and the network activity data source 128, etc.).

In some embodiments, the servers 102 include a fusion and summarization engine 104 and a state database 106. In some embodiments, the fusion and summarization engine 104 receives data feeds from the sensor aggregators 110 and the data source aggregators 120 and determines a presence state of persons based on these data feeds.

In some embodiments, the fusion and summarization engine 104 summarizes data related to the derived state (e.g., the latest status message, the current location in the building). In some embodiments, the fusion and summarization engine 104 uses a hierarchical rule-based architecture to determine the presence states of persons. For example, the hierarchy of data feeds may be ordered as follows (ordered from data feed that is considered first to the one that are considered last): a camera data feed, a network activity data feed, a wireless data feed, a keycard data feed, user-updated status data feed, and a calendar data feed. Note that other orderings are possible. In some embodiments, the fusion and summarization engine 104 uses machine learning techniques (e.g., support vector machines or Bayesian Networks) to statistically determine presence states of persons. In some embodiments, the data feed that provides the highest level of specificity as to the presence state of a respective person is selected. For example, the levels of specificity may be ordered in the same manner as the hierarchy of data feeds in the hierarchical rule-based architecture. In some embodiments, the fusion and summarization engine 104 combines two or more data feeds to produce a higher level of specificity as to the presence state of a respective person.

In some embodiments, the state database 106 stores information collected from the sensor network 111 (e.g., via the sensor aggregators 110) and the external data sources 121 (e.g., via the data source aggregators 120) along with a time that the information was collected. In some embodiments, the state database includes historical presence states of persons and corresponding times when the historical presence states of the persons were determined. In some embodiments, the state database 106 also stores user configuration/preferences and usage logs. In some embodiments, the state database 106 stores information that allows an application 132 of the client computer systems 130 to interface with third-party communication tools.

Figure 6:
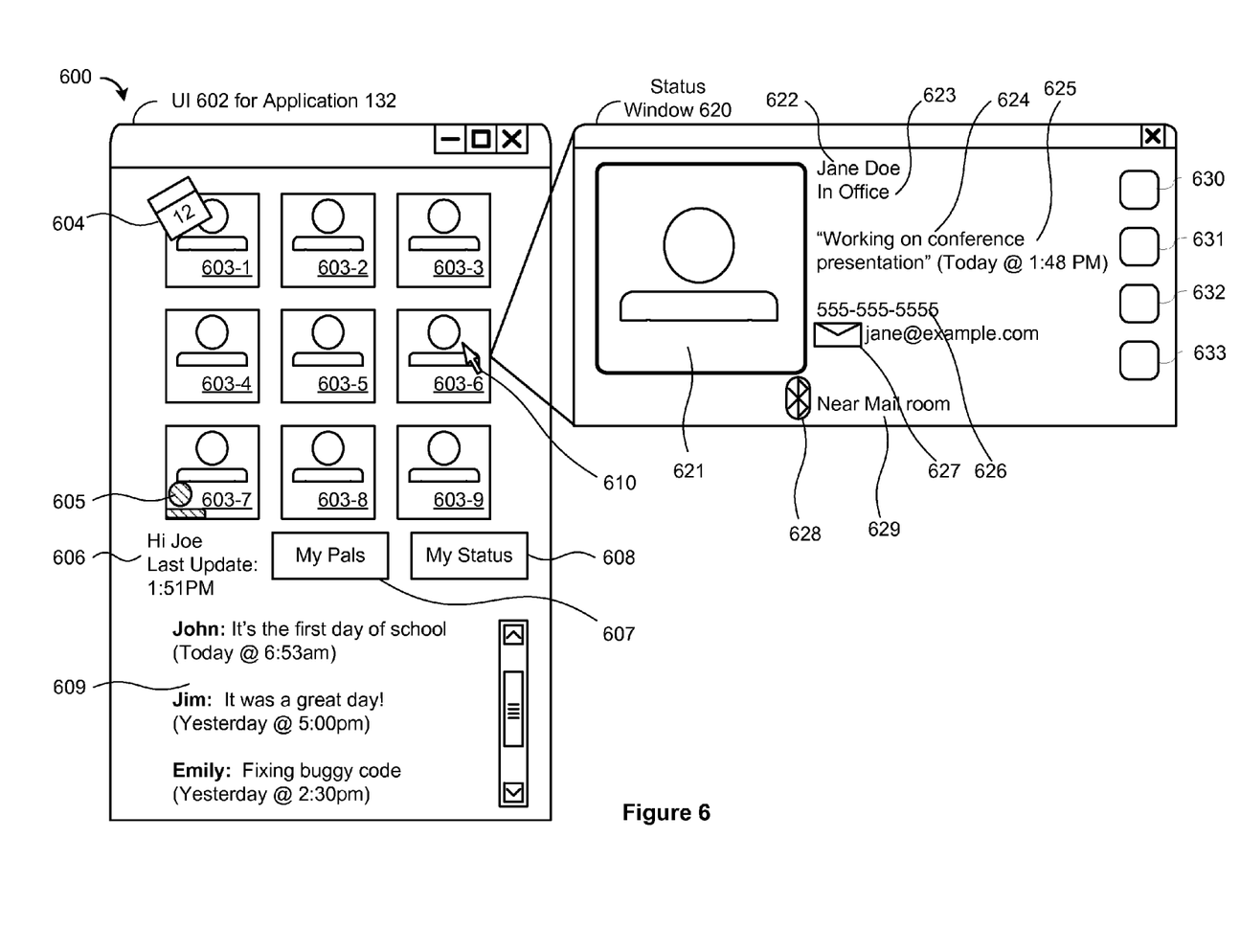
FIG. 6 is a block diagram illustrating a user interface of an application that reports the presence states of persons, according to some embodiments.

In some embodiments, the client computer systems 130 include the application 132 that provides access to the presence states of persons. In some embodiments, the application 132 reports details about how the device (e.g., the client computer systems 130, a mobile device) is connected to the network and whether the user is currently performing keyboard or mouse input actions. This information may be used by the fusion and summarization engine 104 to determine a presence state of a person using the device. Other information, such as currently active applications, may be provided as well. In some embodiments, the application 132 provides both a summary and detailed visualization of presence states and related data for persons in an organization. For example, FIG. 6 is a block diagram 600 illustrating a user interface 602 for the application 132 that reports the presence states of persons in an organization (e.g., a company, an office, a household, etc.), according to some embodiments. The user interface 602 for the application 132 displays a collection of tiles 603 representing persons in the organization. Each of the tiles 603 includes a name and a photograph of a respective person in the organization. In some embodiments, the tiles 603 are color coded and overlaid with icons to convey presence states of persons. For example, the tile 603-1 includes a calendar object 604 indicating that the person associated with the tile 603-1 has a calendar event (e.g., is at a meeting, an appointment, jury duty, vacation, conference, or any other event that may be indicated on a calendar). Similarly, the tile 603-7 includes a visitor object 605 indicating that the person associated with the tile 603-1 has a visitor in the office. Furthermore, a greyed-out tile may indicate that a person is not in the office or that the presence state of the person cannot be determined.

Clicking on (or hovering over) a particular tile in the user interface 602 for the application 132 provides a more detailed view of a particular person's presence state. For example, clicking on (or hovering over) the tile 603-6 produces a status window 620 corresponding to the particular person associated with the tile 603-6. The status window 620 may display a photograph 621 of the particular person, a name 622 of the particular person, a presence state 623 of the particular person, a user-updated status message 624 of the particular person and a time 625 that the user-updated status message was provided (e.g., as updated via the user interface 602 of the application 132), a phone number 626 of the particular person, an email address 627 of the particular person, a sensor 628 that is currently detecting devices registered to the particular person and a corresponding location 629 of the sensor 628. The status window 620 also includes clickable icons 630-633 that may be used to initiate communications with the particular person via corresponding communication channels (e.g., instant messaging or video conferencing).

The user interface 602 for the application 132 also includes information 606 about the last time that the tiles 603 were updated with new information. The "My Pals" tool 607 may be used to add, delete, and/or group persons of an organization. The user interface 602 for the application 132 also provides a data feed 609 displaying the current status messages entered and corresponding times at which the messages were entered by persons in the organization using the user interface 602 for the application 132.

In some embodiments, third party communications tools are linked to the user interface 602 for the application 132 so that persons in the organization can easily transition from gathering awareness about a particular person to engaging in a computer-mediated communication with that person.

Figure 2:
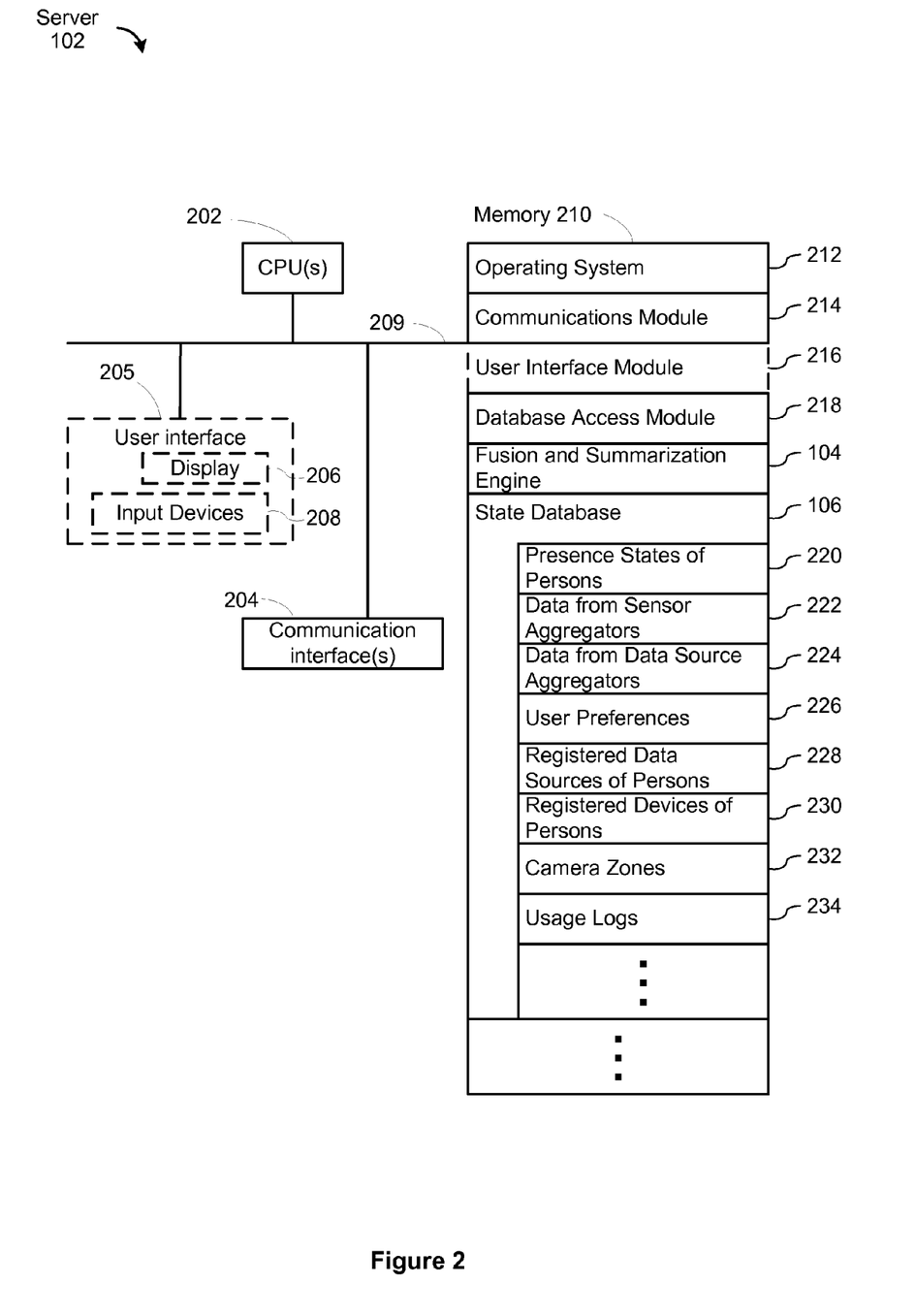
FIG. 2 is a block diagram illustrating a server, according to some embodiments.

FIG. 2 is a block diagram illustrating a server 102, according to some embodiments. The server 102 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The server 102 optionally may include a user interface 205 comprising a display device 206 and input devices 208 (e.g., keyboard, mouse, touch screen, keypads, etc.). Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a computer readable storage medium. In some embodiments, memory 210 stores the following programs, modules and data structures, or a subset thereof:

- an operating system 212 that includes procedures for handling various basic system services and for performing hardware dependent tasks;
- a communication module 214 that is used for connecting the server 102 to other computers via the one or more communication interfaces 204 (wired or wireless) and one or more communication networks, such as the Internet, other wide area networks, local area networks, metropolitan area networks, and so on;
- an optional user interface module 216 that receives commands from the user via the input devices 208 and generates user interface objects in the display device 206;
- a database module 218 that interfaces with databases in the server 102;
- the fusion and summarization engine 104, as described herein; and
- the state database 106, including presence states of persons 220, data from sensors 222, data from data sources 224, user preferences 226, registered data sources of persons 228, registered devices of persons 230, camera zones 232, and usage logs 234, as described herein.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "server," FIG. 2 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

Figure 3:
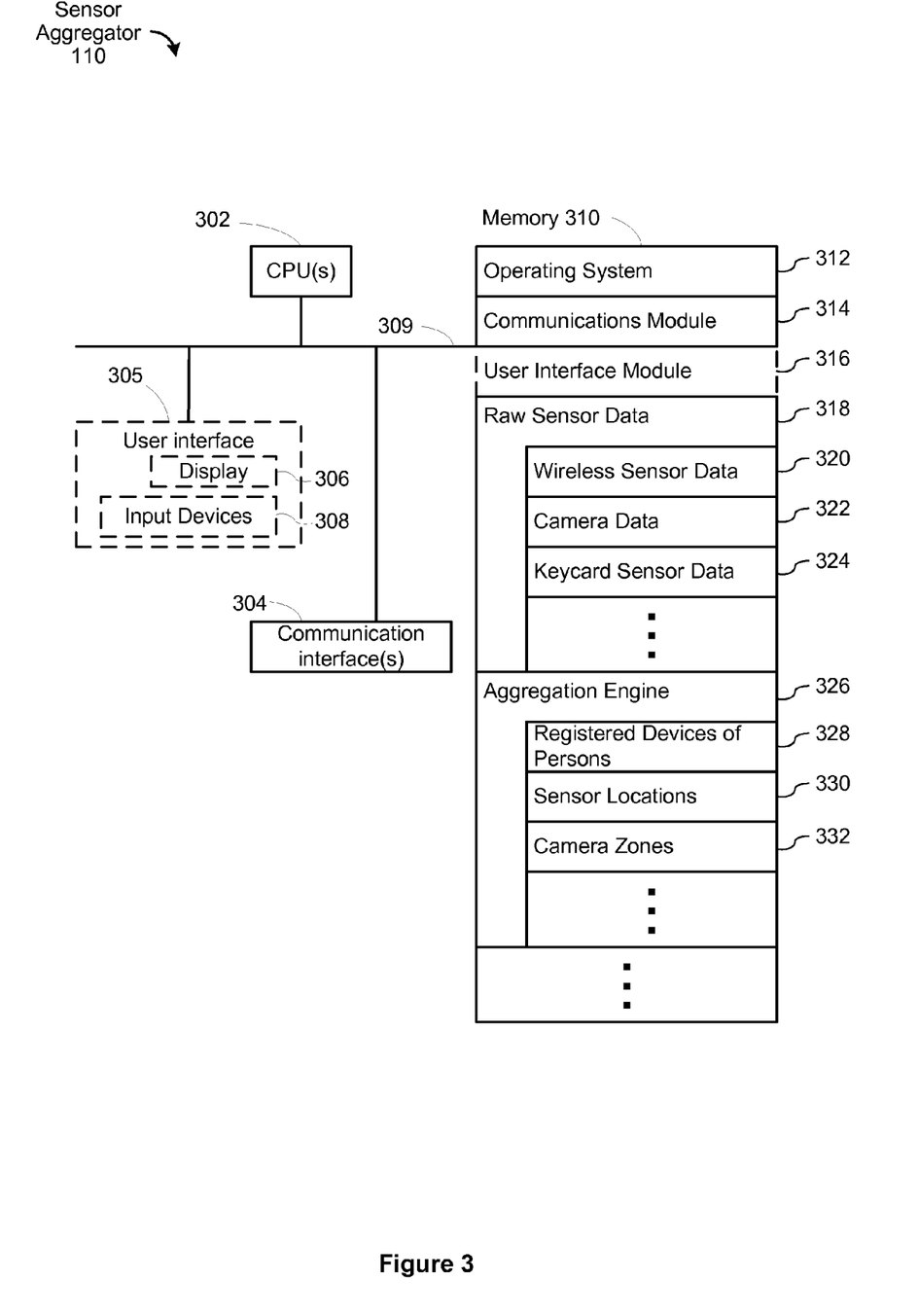
FIG. 3 is a block diagram illustrating a sensor aggregator, according to some embodiments.

FIG. 3 is a block diagram illustrating a sensor aggregator 110, according to some embodiments. The sensor aggregator 110 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. The sensor aggregator 110 optionally may include a user interface 305 comprising a display device 306 and input devices 308 (e.g., keyboard, mouse, touch screen, keypads, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a computer readable storage medium. In some embodiments, memory 310 stores the following programs, modules and data structures, or a subset thereof:

- an operating system 312 that includes procedures for handling various basic system services and for performing hardware dependent tasks;
- a communication module 314 that is used for connecting the sensor aggregator 110 to computer systems and sensors via the one or more communication interfaces 304 (wired or wireless) and one or more communication networks, such as the Internet, other wide area networks, local area networks, metropolitan area networks, and so on;
- an optional user interface module 316 that receives commands from the user via the input devices 308 and generates user interface objects in the display device 306;
- raw sensor data 318 received from sensors (e.g., sensors in the sensor network 111) including wireless sensor data 320, camera data 322, and keycard sensor data 324; and
- an aggregation engine 326 that aggregates the raw sensor data 318 and provides the aggregated sensor data to the server 102, the aggregation engine 326 including data relating to registered devices of persons 328, sensor locations 330, and camera zones 332.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3 shows a "sensor aggregator," FIG. 3 is intended more as a functional description of the various features which may be present in a set of sensor aggregators than as a structural schematic of the embodiments described herein. In practice, and as recognized by those of ordinary skill in the art, items shown separately could be combined and some items could be separated.

Figure 4:
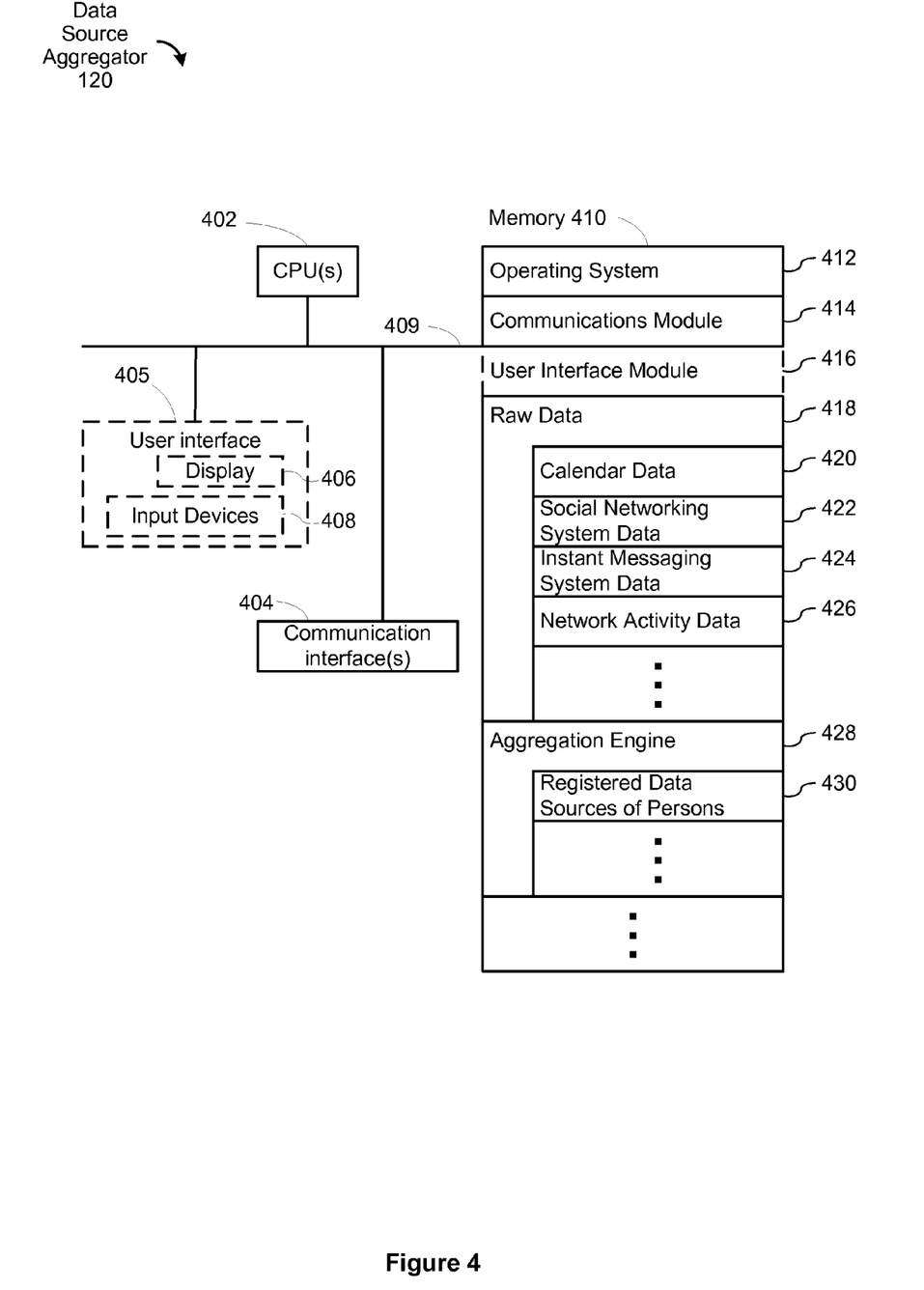
FIG. 4 is a block diagram illustrating a data source aggregator, according to some embodiments.

FIG. 4 is a block diagram illustrating a data source aggregator 120, according to some embodiments. The data source aggregator 120 typically includes one or more processing units (CPU's) 402, one or more network or other communications interfaces 404, memory 410, and one or more communication buses 409 for interconnecting these components. The communication buses 409 may include circuitry (sometimes called a chipset) that interconnects and controls communications between system components. The data source aggregator 120 optionally may include a user interface 405 comprising a display device 406 and input devices 408 (e.g., keyboard, mouse, touch screen, keypads, etc.). Memory 410 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 410 may optionally include one or more storage devices remotely located from the CPU(s) 402. Memory 410, or alternately the non-volatile memory device(s) within memory 410, comprises a computer readable storage medium. In some embodiments, memory 410 stores the following programs, modules and data structures, or a subset thereof:

- an operating system 412 that includes procedures for handling various basic system services and for performing hardware dependent tasks;
- a communication module 414 that is used for connecting the data source aggregator 120 to computer systems and data sources via the one or more communication interfaces 404 (wired or wireless) and one or more communication networks, such as the Internet, other wide area networks, local area networks, metropolitan area networks, and so on;
- an optional user interface module 416 that receives commands from the user via the input devices 408 and generates user interface objects in the display device 406;
- raw data 418 received from data sources (e.g., the external data sources 121), the raw data 418 including calendar data 420, social networking system data 422, instant messaging system data 424, and network activity data 426; and
- an aggregation engine 428 that aggregates the raw data 418 and provides the aggregated data to the server 102, the aggregation engine 428 including data relating to registered data sources of persons 430.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various embodiments. In some embodiments, memory 410 may store a subset of the modules and data structures identified above. Furthermore, memory 410 may store additional modules and data structures not described above.

Although FIG. 4 shows a "data source aggregator," FIG. 4 is intended more as a functional description of the various features which may be present in a set of data source aggregators than as a structural schematic of the embodiments described herein. In practice, and as recognized by those of ordinary skill in the art, items shown separately could be combined and some items could be separated.

Figure 5:
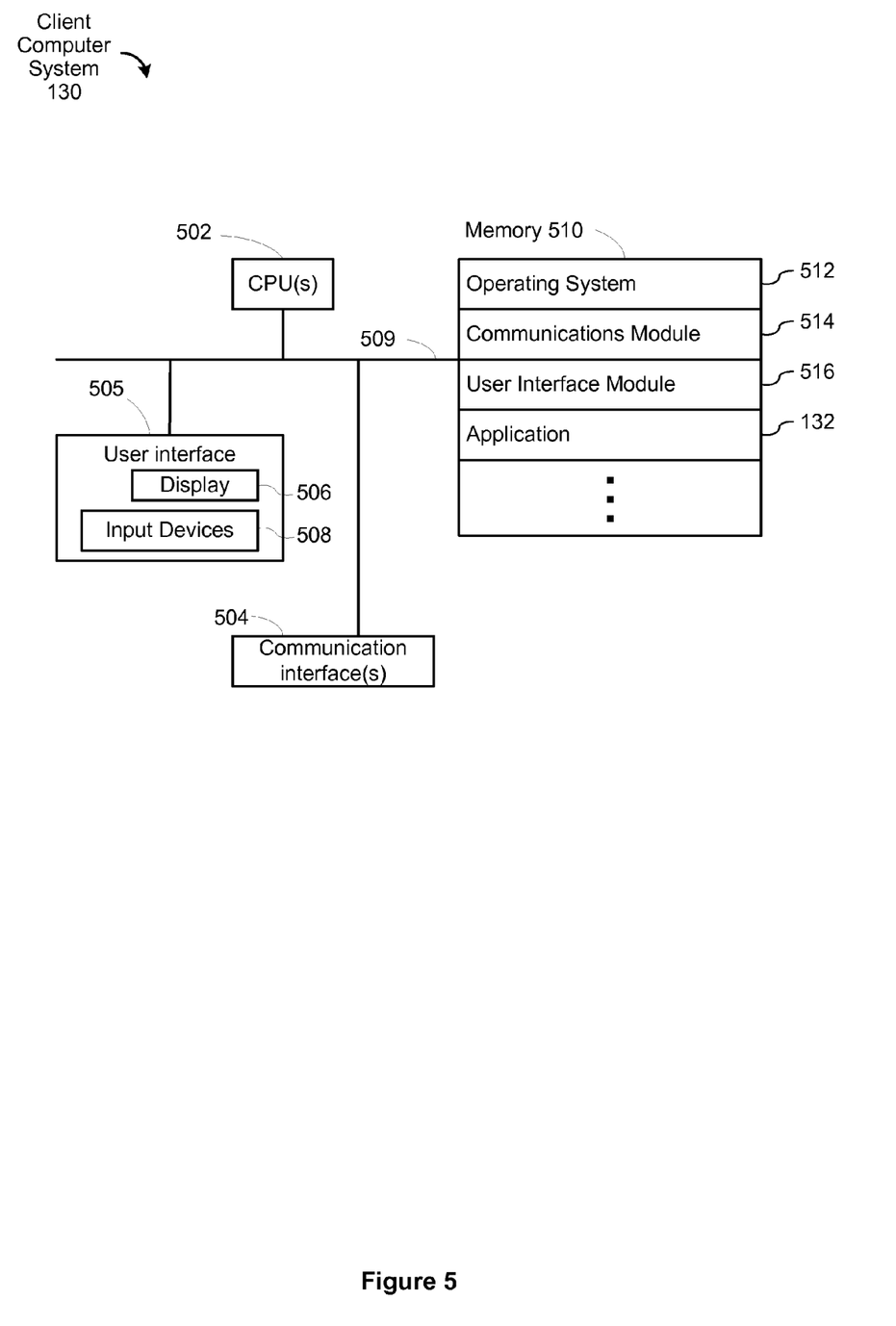
FIG. 5 is a block diagram illustrating a client computer system, according to some embodiments.

FIG. 5 is a block diagram illustrating a client computer system 130, according to some embodiments. The client computer system 130 typically includes one or more processing units (CPU's) 502, one or more network or other communications interfaces 504, memory 510, and one or more communication buses 509 for interconnecting these components. The communication buses 509 may include circuitry (sometimes called a chipset) that interconnects and controls communications between system components. The client computer system 130 also includes a user interface 505 comprising a display device 506 and input devices 508 (e.g., keyboard, mouse, touch screen, keypads, etc.). Memory 510 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 510 may optionally include one or more storage devices remotely located from the CPU(s) 502. Memory 510, or alternately the non-volatile memory device(s) within memory 510, comprises a computer readable storage medium. In some embodiments, memory 510 stores the following programs, modules and data structures, or a subset thereof:

- an operating system 512 that includes procedures for handling various basic system services and for performing hardware dependent tasks;
- a communication module 514 that is used for connecting the client computer system 130 to other computer systems via the one or more communication interfaces 504 (wired or wireless) and one or more communication networks, such as the Internet, other wide area networks, local area networks, metropolitan area networks, and so on;
- a user interface module 516 that receives commands from the user via the input devices 508 and generates user interface objects in the display device 506; and
- the application 132, as described herein.

Each of the above identified elements may be stored in one or more of the previously mentioned memory devices, and corresponds to a set of instructions for performing a function described above. The set of instructions can be executed by one or more processors (e.g., the CPUs 502). The above identified modules or programs (i.e., sets of instructions) need not be implemented as separate software programs, procedures or modules, and thus various subsets of these modules may be combined or otherwise re-arranged in various embodiments. In some embodiments, memory 510 may store a subset of the modules and data structures identified above. Furthermore, memory 510 may store additional modules and data structures not described above.

Although FIG. 5 shows a "client computer system," FIG. 5 is intended more as a functional description of the various features which may be present in a client computer system than as a structural schematic of the embodiments described herein. In practice, and as recognized by those of ordinary skill in the art, items shown separately could be combined and some items could be separated.

Determining Presence States of Persons

Figure 9:
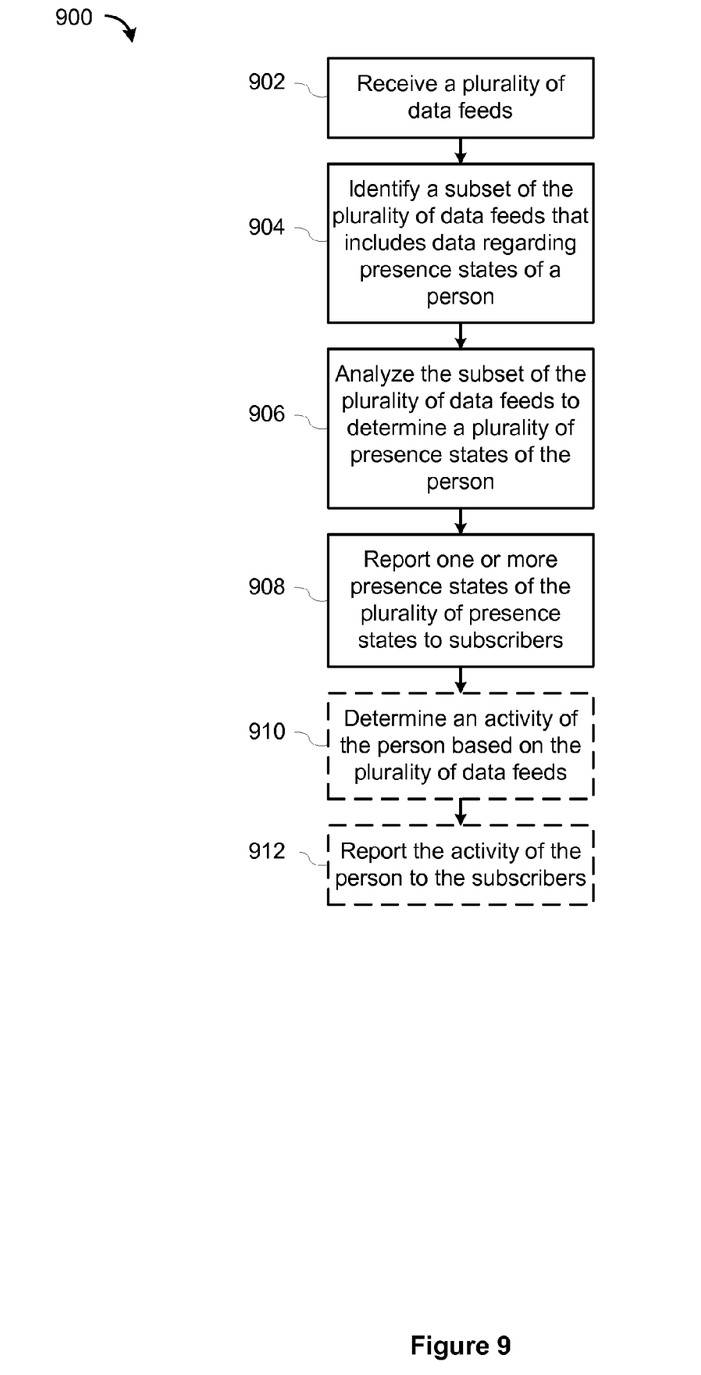
FIG. 9 is a flowchart of a method for determining a presence state of a person, according to some embodiments.

FIG. 9 is a flowchart of a method 900 for determining a presence state of a person, according to some embodiments. The fusion and summarization engine 104 receives (902) a plurality of data feeds, wherein a respective data feed in the plurality of data feeds includes data regarding respective presence states of persons. In some embodiments, the plurality of data feeds is received from the sensor aggregators 110 and/or the data source aggregators 120. In these embodiments, the data in the data feeds are first processed by the aggregators to produce aggregate data that is used by the fusion and summarization engine 104 to determine presence states of persons. In some embodiments, the plurality of data feeds can also be received directly from sensors in the sensor network 111 and/or the external data sources 121. In these embodiments, the fusion and summarization engine 104 uses the raw data from the sensor network 111 and/or the external data sources 121 to determine presence states of persons. In some embodiments, the respective data feed in the plurality of data feeds monitors the respective presence state only if the persons opt into allowing the respective data feed to monitor the respective presence states of the persons.

Next, the fusion and summarization engine 104 identifies (904) a subset of the plurality of data feeds that includes data regarding presence states of a person.

The fusion and summarization engine 104 then analyzes (906) the subset of the plurality of data feeds to determine a plurality of presence states of the person, wherein a respective presence state of the person is determined from a respective data feed in the subset of the plurality of data feeds.

In some embodiments, a video feed aggregator (e.g., a sensor aggregator 110) analyzes a video data feed to determine whether the person is in the office, a visitor is in the office of the person, or the person is not in the office. In some embodiments, the video feed aggregator determines whether the person is in the office by determining whether the video data feed includes movement in a user-defined zone typically occupied by the person when the person is in the office. In some embodiments, the video feed aggregator determines whether a visitor is in the office of the person by determining whether the video data feed includes movement in a user-defined zone typically occupied by a visitor when a visitor is in the office. In some embodiments, the video feed aggregator determines whether the person is not in the office by determining whether the video data feed does not include movement. The video data aggregator provides an aggregate video data feed including data about whether the person is in the office, a visitor is in the office of the person, or the person is not in the office to the fusion and summarization engine 104.

In some embodiments, a wireless sensor feed aggregator (e.g., a sensor aggregator 110) analyzes a wireless data feed to determine a respective presence state of the person by analyzing the wireless data feed to determine whether a wireless device registered to the person is within range of a wireless sensor.

In some embodiments, a keycard sensor feed aggregator (e.g., a sensor aggregator 110) analyzes a keycard data feed to determine a respective presence state of the person by analyzing the keycard data feed to determine whether a keycard registered to the person was used at a keycard sensor.

In some embodiments, a calendar data aggregator (e.g., a data source aggregator 120) analyzes a calendar data feed to determine a respective presence state of the person by analyzing the calendar data feed to determine whether the person is at an appointment.

In some embodiments, a status data aggregator (e.g., a data source aggregator 120) analyzes a user-updated status data feed to determine a respective presence state of the person by analyzing the user-updated status data feed to determine the current status of the person.

In some embodiments, a network activity data aggregator (e.g., a data source aggregator 120) analyzes a network data feed to determine a respective presence state of the person by analyzing the network data feed to determine whether a network device registered to the person is being actively used on the network. In some embodiments, the network activity data aggregator analyzes the network data feed to determine a location at which the network device is being used. For example, the location may be in an office building, a home, or a public building.

Returning to FIG. 9, the fusion and summarization engine 104 reports (908) one or more presence states of the plurality of presence states to subscribers via the network. For example, consider two data feeds that include data regarding the presence states of a person, where a first data feed indicates that the person is using the person's computer and the second data feed indicates the person is connected to the corporate network remotely (e.g., outside of the corporate LAN). The fusion and summarization engine 104 may report a single presence state of the person (e.g., from one of the two data feeds) or combine two or more presence states of the person to provide a higher level of specificity as to the presence state of the person (e.g., the person is using the person's computer to remotely connect to the corporate LAN). The manner in which the fusion and summarization engine 104 reports the presence state of the person may be configured by an administrator. For example, the administrator may designate data feeds that may be combined (and a hierarchy of combinations in cases where only one combination is to be reported). Note that the fusion and summarization engine 104 may also allow an end user to configure the manner in which the fusion and summarization engine 104 reports the presence state of the person. In some embodiments, fusion and summarization engine 104 selects one or more presence states of the person that provides the highest levels of specificity as to the presence states of the person. For example, when reporting more than one presence state of the person, the presence states selected by the fusion and summarization engine 104 are the presence states with the highest levels of specificity (e.g., the most detail or the greatest resolution). The hierarchy of the levels of specificity may be configured by an administrator or an end user. In some embodiments, the subscribers are members of an organization (e.g., a company, an office, or a household).

In some embodiments, the one or more presence states are selected from the group consisting of: real-time presence states and historical presence states. In embodiments where real-time presence states are reported, the fusion and summarization engine 104 processes real-time data received from the plurality of data feeds. In embodiments where historical presence states are reported, the fusion and summarization engine 104 reports previously-determined presence states that are stored in the state database 106.

In some embodiments, only one of the plurality of presence states for the person is reported, specifically the presence state for the person that has the highest level of specificity as to the presence state of the person.

In some embodiments, when the presence state of the person is below a predetermined level of specificity, the fusion and summarization engine 104 reports a last-known presence state of the person that is above the predetermined level of specificity and a time at which the last-known presence state was determined.

In some embodiments, the presence state of the person and a plurality of other subscribers are displayed in a user interface of an application on a client computer system of a respective subscriber (e.g., the user interface 602 for the application 132).

In some embodiments, the presence state of the person includes a location and an activity of the person. A location describes the physical location of the person and an activity describes what the person is doing (e.g., in a meeting, working on a particular project, or out to lunch). In these embodiments, the fusion and summarization engine 104 determines (910) an activity of the person based on the plurality of data feeds and reports (912) the activity of the person to the subscribers. In some embodiments, the fusion and summarization engine 104 determines the activity of the person based on one or more of: an appointment obtained from one or more calendars, a user-updated status from an application that reports the status of subscribers (e.g., the application 132), a user-updated status from an instant messaging system, and a user-updated status from a social networking system.

In some embodiments, the one or more presence states of the person are determined using an algorithm selected from the group consisting of rule-based algorithms and statistical and probabilistic modeling algorithms.

Figure 10:
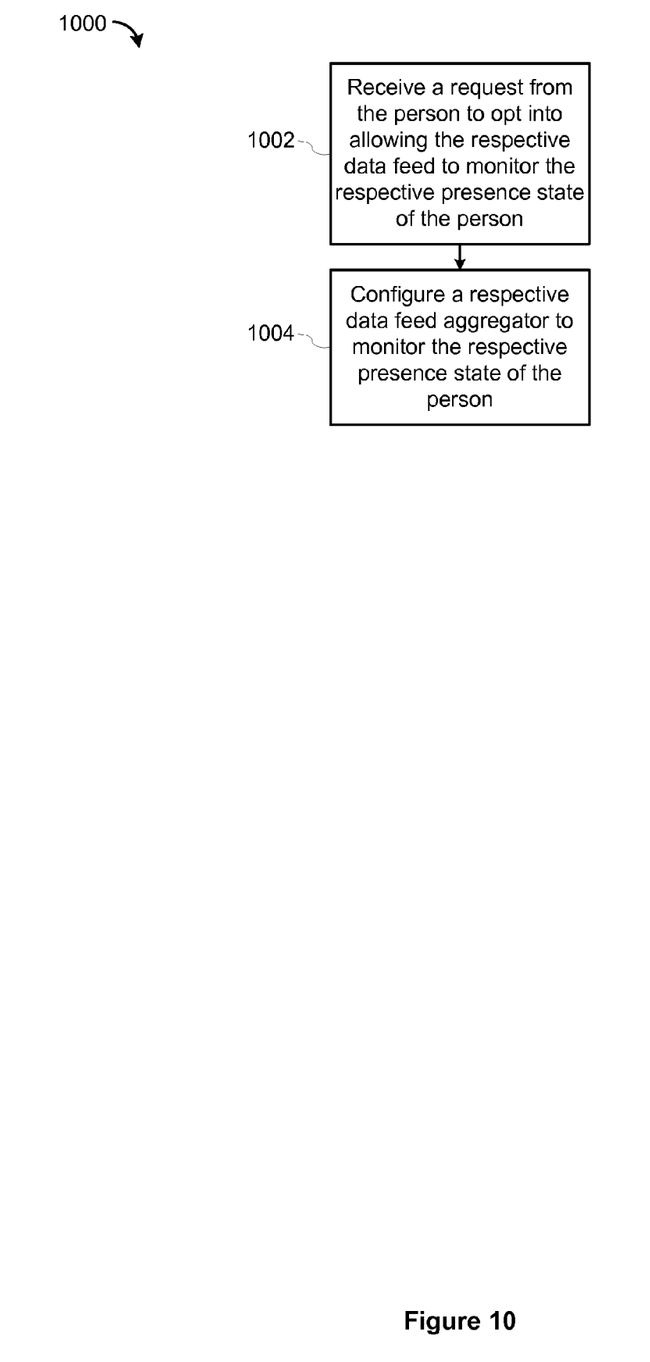
FIG. 10 is a flowchart of a method for configuring a data feed aggregator to monitor a presence state of a person, according to some embodiments.

Note that the embodiments described herein are not meant to track persons, but are instead used to provide group awareness of the availability of persons. Accordingly, some embodiments allow persons to opt into allowing data feeds to monitor the presence states of the person. FIG. 10 is a flowchart of a method 1000 for configuring a data feed aggregator to monitor a presence state of a person, according to some embodiments. The server 102 receives (1002) a request from the person to opt into allowing the respective data feed to monitor the respective presence state of the person. In some embodiments, the server 102 receives (1002) a request from an administrator to opt into allowing the respective data feed to monitor the respective presence state of the person. In some embodiments, the respective data feed is received from a respective physical sensor, and the request from the person (or the administrator) includes a respective device identifier for a respective device of the person that is to be monitored by the respective data feed. In these embodiments, the server 102 associates the device identifier for the device with the person and stores this information in the registered devices of persons 230. In some embodiments, the respective data feed is received from a respective data source, and the request from the person (or the administrator) includes a respective data source identifier of the person that is to be monitored by the respective data feed. In these embodiments, the server 102 associates the data source identifier for the data source with the person and stores this information in the registered data sources of persons 228.

The server 102 then configures (1004) a respective data feed aggregator to monitor the respective presence state of the person. For example, the server 102 transmits information about the registered devices of persons 230 to the sensor aggregators 110 to be stored as the registered devices of persons 328. Similarly, the server 102 may transmit information about the registered data sources of persons 228 to the data source aggregators 120 to be stored as the registered data sources of persons 430.

Figure 7:
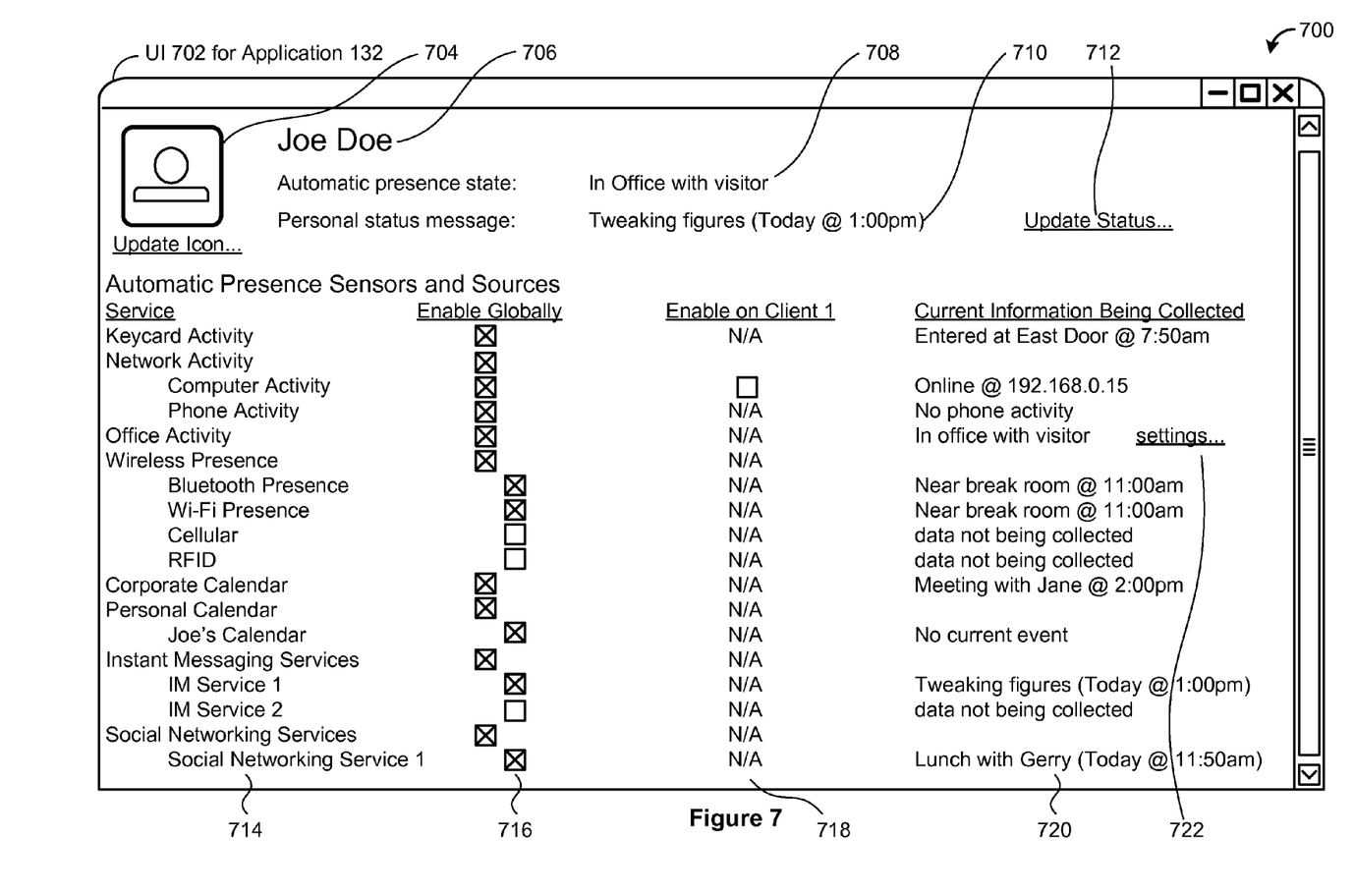
FIG. 7 is a block diagram illustrating a user interface of an application that allows a person to opt into allowing data feeds to monitor the presence state of the person, according to some embodiments.

FIG. 7 is a block diagram 700 illustrating user interface 702 of the application 132 that allows a person to opt into allowing data feeds to monitor the presence state of the person, according to some embodiments. The user interface 702 of the application 132 includes a photo 704 of the person, the name 706 of the person, a presence state 708 of the person (e.g., as determined by the fusion and summarization engine 104), and a status message 710 that was entered by the person using the user interface 602 for the application 132 and/or using the "Update Status" link 712. The user interface 702 for the application 132 allows the person to enable or disable services 714 that monitor the presence state of the person (e.g., the data feeds) by checking or unchecking checkboxes 716 (globally enable) and checkboxes 718 (enabled for particular devices). The user interface 702 for the application 132 also displays the current information being collected by the services 720. The person may use the "settings" link 722 to invoke a tool that allows the person to define zones of the person's office workspace that indicate whether the person is in the office, the person is in the office with a visitor, or the person is not in the office (e.g., see FIG. 8).

The methods 900 and 1000 may be governed by instructions that are stored in a computer readable storage medium and that are executed by one or more processors of one or more servers. Each of the operations shown in FIGS. 9 and 10 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a computer system including one or more processors and memory storing one or more programs, the computer system being coupled to a plurality of subscribers via a network, and the one or more processors executing the one or more programs to perform the operations of:
obtaining first presence information that corresponds to a first calendar of a user;
obtaining second presence information that corresponds to a second calendar of the user that is different from the first calendar;
determining presence states of the user including determining, based on the first presence information, a first presence state of the user and determining, based on the second presence information, a second presence state of the user;
selecting a respective presence state of the user from the presence states of the user;
providing the respective presence state of the user, selected from the presence states of the user, to the subscribers via the network; and
providing instructions that enable display of a graphical user interface that includes a respective graphical indication of the respective presence state of the user at a device associated with one of the subscribers, wherein, when the respective presence state of the user indicates that the user is currently occupied by a calendar event, the respective graphical indication of the respective presence state is visually distinguished from other graphical indications of other presence states that do not indicate that the user is currently occupied by a calendar event.

2. The method of claim 1, wherein the respective presence state is visually distinguished from other graphical indications by displaying a calendar icon that is visually associated with the respective graphical indication of the respective presence state in the graphical user interface.

3. The method of claim 1, wherein the user has a plurality of calendars and the presence states of the user are determined based on a subset of the calendars.

4. The method of claim 1, wherein the first presence information is based on a combination of data from the first calendar of the user and data from a respective non-calendar source.

5. The method of claim 4, wherein:
the first calendar includes an event at a respective time and/or a respective location; and
the respective non-calendar source includes additional information about activity that occurred at the respective time and/or the respective location.

6. The method of claim 1, wherein the first calendar and the second calendar are calendars selected from a set consisting of: a personal calendar, a group calendar, an event calendar, and a business calendar.

7. The method of claim 1, wherein:
the presence states of the user are further based on third presence information that is different from the first presence information and the second presence information; and
the third presence information is based on data provided by a presence information source selected from a set consisting of: a social networking system, an instant messenger system, a network activity data source, and a mobile device data source.

8. A system for, comprising:
one or more processors;
memory; and
one or more programs stored in the memory, the one or more programs comprising instructions to:
obtain first presence information that corresponds to a first calendar of a user;
obtain second presence information that corresponds to a second calendar of the user that is different from the first calendar;
determine presence states of the user including determining, based on the first presence information, a first presence state of the user and determining, based on the second presence information, a second presence state of the user;
select a respective presence state of the user from the presence states of the user;
provide the respective presence state of the user, selected from the presence states of the user, to the subscribers via the network; and
provide instructions that enable display of a graphical user interface that includes a respective graphical indication of the respective presence state of the user at a device associated with one of the subscribers, wherein, when the respective presence state of the user indicates that the user is currently occupied by a calendar event, the respective graphical indication of the respective presence state is visually distinguished from other graphical indications of other presence states that do not indicate that the user is currently occupied by a calendar event.

9. The system of claim 8, wherein the respective presence state is visually distinguished from other graphical indications by displaying a calendar icon that is visually associated with the respective graphical indication of the respective presence state in the graphical user interface.

10. The system of claim 8, wherein the user has a plurality of calendars and the presence states of the user are determined based on a subset of the calendars.

11. The system of claim 8, wherein the first presence information is based on a combination of data from the first calendar of the user and data from a respective non-calendar source.

12. The system of claim 11, wherein:
the first calendar includes an event at a respective time and/or a respective location; and
the respective non-calendar source includes additional information about activity that occurred at the respective time and/or the respective location.

13. A non-transitory computer readable storage medium storing one or more programs configured for execution by a computer, the one or more programs comprising instructions to:
obtain first presence information that corresponds to a first calendar of a user;
obtain second presence information that corresponds to a second calendar of the user that is different from the first calendar;
determine presence states of the user including determining, based on the first presence information, a first presence state of the user and determining, based on the second presence information, a second presence state of the user;
select a respective presence state of the user from the presence states of the user;
provide the respective presence state of the user, selected from the presence states of the user, to the subscribers via the network; and
provide instructions that enable display of a graphical user interface that includes a respective graphical indication of the respective presence state of the user at a device associated with one of the subscribers, wherein, when the respective presence state of the user indicates that the user is currently occupied by a calendar event, the respective graphical indication of the respective presence state is visually distinguished from other graphical indications of other presence states that do not indicate that the user is currently occupied by a calendar event.

14. The non-transitory computer readable storage medium of claim 13, wherein the respective presence state is visually distinguished from other graphical indications by displaying a calendar icon that is visually associated with the respective graphical indication of the respective presence state in the graphical user interface.

15. The non-transitory computer readable storage medium of claim 13, wherein the user has a plurality of calendars and the presence states of the user are determined based on a subset of the calendars.

16. The non-transitory computer readable storage medium of claim 13, wherein the first presence information is based on a combination of data from the first calendar of the user and data from a respective non-calendar source.

17. The non-transitory computer readable storage medium of claim 16, wherein:
the first calendar includes an event at a respective time and/or a respective location; and
the respective non-calendar source includes additional information about activity that occurred at the respective time and/or the respective location.

* * * * *